US012670778B2

(12) United States Patent
Sandrapaty

(10) Patent No.: US 12,670,778 B2
(45) Date of Patent: Jun. 30, 2026

(54) DROWNING PREVENTION SYSTEM

(71) Applicant: Vivek Sandrapaty, Ocala, FL (US)

(72) Inventor: Vivek Sandrapaty, Ocala, FL (US)

(*) Notice: Subject to any disclaimer, the term of this patent is extended or adjusted under 35 U.S.C. 154(b) by 61 days.

(21) Appl. No.: 18/405,700

(22) Filed: Jan. 5, 2024

(65) Prior Publication Data

US 2024/0233508 A1 Jul. 11, 2024

Related U.S. Application Data

(60) Provisional application No. 63/437,219, filed on Jan. 5, 2023.

(51) Int. Cl.
*G08B 21/08* (2006.01)

(52) U.S. Cl.
CPC .................................. *G08B 21/088* (2013.01)

(58) Field of Classification Search
CPC .............................. G08B 21/088; G08B 21/02
See application file for complete search history.

(56) References Cited

U.S. PATENT DOCUMENTS 5,091,714 A * 2/1992 de Solminihac ....... A62B 99/00 441/89
5,097,254 A * 3/1992 Merrithew ........... G08B 21/088 340/529
5,408,222 A * 4/1995 Yaffe ..................... B63C 9/0005 455/344
6,154,140 A * 11/2000 Thorpe ................ G08B 21/088 340/626
6,736,759 B1 * 5/2004 Stubbs ............... A63B 24/0021 482/8
9,854,081 B2 * 12/2017 Shoemaker ......... G06F 3/04847
11,676,471 B2 * 6/2023 Rogers ................... G06V 40/10 340/573.6
2003/0189484 A1 * 10/2003 Rust ................... G09B 19/0038 340/539.23
2007/0132578 A1 * 6/2007 Powell ................. G08B 21/023 340/539.22
2008/0218332 A1 * 9/2008 Lyons .................. G08B 21/088 340/529
2008/0266118 A1 * 10/2008 Pierson ................ A61B 5/0205 340/573.6
2008/0278338 A1 * 11/2008 Krell .................... G08B 21/088 340/573.6
2009/0009342 A1 * 1/2009 Karjalainen ......... A61B 5/6831 375/224
2009/0027211 A1 * 1/2009 Cutler ....................... E04H 4/06 340/573.6

(Continued)

*Primary Examiner* — Curtis J King
(74) *Attorney, Agent, or Firm* — The Concept Law Group, PA; Scott D. Smiley; Scott M. Garrett

(57) ABSTRACT

A drowning prevention system includes an alerting device worn on the body of a person which monitors the person's blood oxygen level. When the alert device is submerged, if the person's blood oxygen level falls below a threshold, then the alert device will begin emitting an alert sound. The alert sound will be picked up or otherwise detected by one or more hydrophones in the water. The hydrophone output is constantly monitored to determine if the alert sound is occurring in the water. If an alert sound is detected at one of the hydrophones, a receiving unit to which the hydrophones are coupled generates an alert that is perceptible to other persons in the proximity of the receiving.

11 Claims, 7 Drawing Sheets

(56) References Cited

U.S. PATENT DOCUMENTS

| | | | | |
|---|---|---|---|---|
| 2009/0295566 | A1* | 12/2009 | Weintraub | G08B 21/088<br>340/573.6 |
| 2010/0176956 | A1* | 7/2010 | Moerschell | E04H 4/06<br>340/626 |
| 2011/0187538 | A1* | 8/2011 | Hawkins | G08B 21/088<br>340/573.6 |
| 2011/0241887 | A1* | 10/2011 | McKinney | G08B 21/088<br>340/573.6 |
| 2012/0062377 | A1* | 3/2012 | Mock | G08B 21/088<br>340/539.11 |
| 2014/0171270 | A1* | 6/2014 | Frolov | A63B 35/00<br>482/55 |
| 2015/0161866 | A1* | 6/2015 | Jechart | A47K 3/001<br>340/573.1 |
| 2017/0274247 | A1* | 9/2017 | Miyasaka | G16H 50/30 |
| 2018/0043210 | A1* | 2/2018 | Niehaus | A61B 5/1118 |
| 2018/0190084 | A1* | 7/2018 | Mandlakazi | G08B 7/06 |
| 2020/0020221 | A1* | 1/2020 | Cutler | G08B 21/088 |
| 2022/0036717 | A1* | 2/2022 | Lovett | G06F 1/163 |
| 2022/0246017 | A1* | 8/2022 | Rosenberg | G06V 40/10 |
| 2022/0309897 | A1* | 9/2022 | Bender | A61B 5/0002 |
| 2024/0105043 | A1* | 3/2024 | Badic | G08B 21/088 |

* cited by examiner

DROWNING PREVENTION SYSTEM

CROSS REFERENCE

This application claims priority to U.S. provisional application No. 63/437,219, filed Jan. 5, 2023, the entirely of which is hereby incorporated by reference.

FIELD OF THE INVENTION

The present invention relates generally to drowning prevention, and, more particularly, relates to a wearable device that monitors blood oxygen saturation and transmits an acoustic signal to a receiver in the water if the wearer's oxygen level has been under a threshold level for a selected period of time.

BACKGROUND OF THE INVENTION

Drowning is a serious concern when it comes to water recreation activities. Whether at a beach or in a residential pool, drownings happen far too often. Lifeguards are posted at public beaches and swimming pools to identify swimmers in distress and rescue them, but private facilities, particularly residential pools, do not typically have lifesaving professionals available. There are a number of devices available in the market that seek to prevent drownings. One such device is a simple pool monitor that is used when no one is swimming in the pool; the device senses waves that would be created if, for example, a toddler fell into the pool. If waves are detected, then an alarm is generated. However, this depends on there normally being no one in the pool so that the surface of the water is largely undisturbed. Such a system is not usable when there are people in the pool. It is also known that the more people there are in a pool, the more difficult it is to monitor everyone, and it is unfortunately the case that people have drowned in busy pools simply because they were not noticed.

Several personal solutions have been tried as well. For example, a motion detector (e.g., an accelerometer) can detect both rapid, apparently agitated motion, consistent with someone struggling to stay above the water's surface, and a lack of motion, such as when someone loses consciousness. However, these motion states are also consistent with, for example, vigorously swimming and resting peacefully (e.g., floating or simply standing still).

Therefore, a need exists to overcome the problems with the prior art as discussed above.

SUMMARY OF THE DISCLOSURE

In accordance with some embodiments of the inventive disclosure, there is provided a drowning prevention system that includes a wearable unit configured to detect a wearer's blood oxygen saturation level. When the wearer's blood oxygen saturation level falls before a preselected threshold for at least a preselected duration of time, the wearable unit is further configured to emit an audio signal at a frequency selected to propagate through water. The system further includes a receiving unit having a hydrophone that is configured to receive the audio signal in water, and in response generate an audible alert sound in air.

In accordance with another feature, the preselected duration of time is based on at least two consecutive periodic readings of the wearer's blood oxygen saturation level.

In accordance with another feature, wherein the wearable unit comprises a light-based blood oxygen sensor.

In accordance with another feature, wherein the wearable unit comprises an audio driver that is coupled to an acoustic transducer, wherein the audio driver provides a signal to the acoustic transducer the causes the acoustic transducer to emit the audio signal.

In accordance with another feature, wherein the wearable unit contains a rechargeable battery.

In accordance with another feature, wherein the wearable unit further comprises a charging coil that is used to charge the rechargeable battery.

In accordance with another feature, wherein the receiving unit comprises a plurality hydrophones and a graphical interface, wherein the receiving unit is configured to determine a location of the wearable unit based on receiving the audio signal at the plurality of hydrophones and indicate the location on the graphical interface.

In accordance with another feature, wherein the receiving unit further comprises a wireless networking radio transceiver and is further configured to transmit an alert message via the wireless networking radio transceiver.

In accordance with some embodiments of the inventive disclosure, there is provided a wearable unit for preventing drowning that includes a case containing blood oxygen saturation sensor, an acoustic transducer, and controller. The controller is configured to evaluate a real time output of the blood oxygen saturation sensor and operate the acoustic transducer to emit an alert sound upon a level of the output of the blood oxygen saturation sensor being below a preselected threshold. The wearable unit further includes a strap coupled to the case and configured to hold the case against a wearer's skin.

In accordance with another feature, the controller is configured to detect the blood oxygen level being below the preselected threshold for a period of time before operating the acoustic transducer.

In accordance with another feature, the period of time is based on a number of successive periodic readings of the blood oxygen sensor indicating that the blood oxygen saturation is below the preselected threshold.

In accordance with another feature, the blood oxygen saturation sensor uses light to determine the blood oxygen saturation.

In accordance with another feature, the wearable unit further contains a rechargeable battery.

In accordance with another feature, the wearable unit further comprises a charging coil that is used to charge the rechargeable battery.

In accordance with some embodiments of the inventive disclosure, there is provided a method for prevention of drowning which includes providing a wearable unit that is worn on a body of a wearer. The wearable unit including a blood oxygen saturation sensor. The method further including producing, periodically, by the blood oxygen saturation sensor, a blood oxygen saturation value, and comparing the blood oxygen saturation values with a preselected threshold. When the blood oxygen saturation values are below the preselected threshold, the method further includes the wearable unit emitting an alarm sound. The method further includes providing a receiving unit that includes at least one hydrophone and detecting at the receiving unit, via the at least one hydrophone, the alarm sound emitted by the wearable unit. And in response to detecting the alarm sound, the method includes the receiving unit generating an alarm.

In accordance with another feature, the receiving unit generating the alarm comprises generating an audible alarm in air.

In accordance with another feature, the receiving unit generating the alarm comprises transmitting a message via a wireless networking radio transceiver.

In accordance with another feature, the at least one hydrophone comprises a plurality of hydrophones, detecting the alarm sound comprises detecting the alarm sound at at least three hydrophones of the plurality of hydrophones, and determining a location of the wearable unit relative to the at least three hydrophones.

Although the invention is illustrated and described herein as embodied in a drowning prevention system, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

"In the description of the embodiments of the present invention, unless otherwise specified, azimuth or positional relationships indicated by terms such as "up", "down", "left", "right", "inside", "outside", "front", "back", "head", "tail" and so on, are azimuth or positional relationships based on the drawings, which are only to facilitate description of the embodiments of the present invention and simplify the description, but not to indicate or imply that the devices or components must have a specific azimuth, or be constructed or operated in the specific azimuth, which thus cannot be understood as a limitation to the embodiments of the present invention. Furthermore, terms such as "first", "second", "third" and so on are only used for descriptive purposes, and cannot be construed as indicating or implying relative importance.

In the description of the embodiments of the present invention, it should be noted that, unless otherwise clearly defined and limited, terms such as "installed", "coupled", "connected" should be broadly interpreted, for example, it may be fixedly connected, or may be detachably connected, or integrally connected; it may be mechanically connected, or may be electrically connected; it may be directly connected, or may be indirectly connected via an intermediate medium. As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. To the extent that the inventive disclosure relies on or uses software or computer implemented embodiments, the terms "program," "software application," and the like as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/dynamic load library and/or other sequence of instructions designed for execution on a computer system. Those skilled in the art can understand the specific meanings of the above-mentioned terms in the embodiments of the present invention according to the specific circumstances.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

Figure 1A:
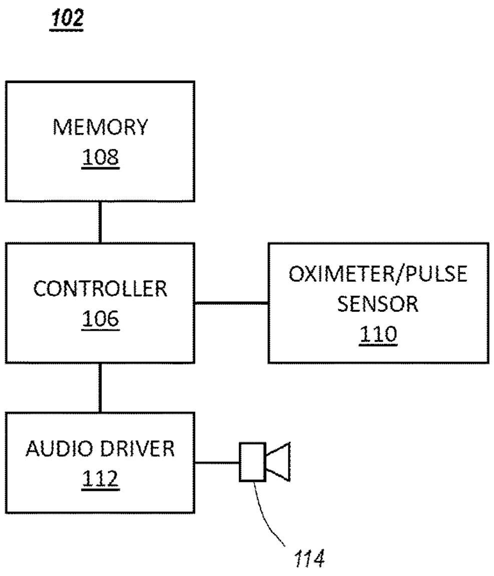
FIG. 1A is a block schematic diagram of a wearable drowning prevention sensor unit that emits an acoustic alarm signal if the wearer appears to be drowning.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

FIG. 1A is a block schematic diagram of a wearable drowning prevention sensor unit 102 that emits an acoustic alarm signal if the wearer appears to be drowning, as indicated by their blood oxygen level, and possibly their heart rate. The unit 102 includes a controller 106 that can include a microprocessor and associated circuitry. The controller is coupled to memory 108 that, as shown here, can represent an aggregate memory that includes read only memory (ROM), random access memory (RAM), cache, reprogrammable memory, and so on that can all be separately addressable and used for different purposes. The memory 108 includes memory components for non-volatile storage of instruction code, as well as memory for instantiating an application program of instruction code and various variables and other data structures, and in some embodiments, an operating system. The controller is operably coupled to an oxygen sensor 110 that detects the level of oxygen in a person's blood, and provides a blood oxygen sensor value to the controller in real time. The sensor 110 can be a common oximeter that uses different light wavelengths to determine the blood oxygen level, which is expressed as a percentage relative to a normal maximum oxygen saturation level. Such sensors are commonly used in medical practice, and on "smart" watches and wrist-worn fitness devices. These sensors are also capable of detecting the wearer's pulse/heart rate.

When a person is deprived of oxygen, such as when they are drowning, then their blood oxygen saturation level will decrease since water in the lungs blocks the uptake and replenishment of oxygen in the blood. The controller 106 monitors the real time value output by the sensor 110, and if the value indicates that the blood oxygen sensor level has fallen below a threshold (e.g. 90%), then the controller will operate an audio circuit including an audio driver 112 that causes an acoustic transducer 114 to emit an audio signal as an alert. The audio signal can be a tone that is emitted constantly so that it can be heard and detected by an acoustic receiving device. In some cases, the controller may apply a brief time threshold as well so that the blood oxygen level must be below the low blood oxygen threshold for a period of time in order to assure that the sensor isn't faulting due to, for example, the sensor being loose or there being a gap between the sensor and the wearer's skin that causes an intermittent/low reading momentarily. The time threshold, if used, should be kept short, obviously, just long enough to ensure that the sensor reading is not faulty. In some embodiments the time threshold can be implicit such as by requiring two or more consecutive readings by the sensor that are under the blood oxygen threshold, where readings are performed at regular intervals.

It will be understood that the unit 102 is configured to be wearable, such as on a person's wrist/forearm, and that the unit 102 is completely waterproof. Further, the acoustic transducer 114 is configured to operate under water. The unit 102 is battery powered (not shown here) and can be rechargeable. If the charge of the battery is low, the controller 106 can cause the audio components to emit an audio signal that is different than that used to alert of a possible drowning so that that people will know to recharge the battery of the unit 102.

The schematic blocks shown here in FIG. 1A are intended to be inclusive. Other functions, including functions that are unrelated to drowning prevention, can be included. For example, the unit 102 can include a wireless networking radio transceiver, such as those used for communication via WiFi or BLUETOOTH communication protocols. In some embodiments, the unit 102 can be a smartwatch device that includes an audio transducer 114 suitable for audio transmission in water.

When the controller 106 determines that the blood oxygen level, as indicated by the sensor 110, has dropped below the threshold, it activates the audio driver 112 to drive the transducer to emit an audio alert. The audio alert can be a constant tone, such as a sinusoidal wave at a preferred frequency. In testing it has been found that what are considered mid-range audio frequencies for human hearing (e.g., 500-2000 Hz) propagate well through water. In some embodiments a tone of 1500 Hz can be used. In some embodiments, the alert sound may be varied between one or more frequencies, or one or more sounds (i.e., having complex frequency content). In some embodiments different units 102 can be set to emit different frequencies so that the wearer of the unit 102 can be identified based on the frequency of the alarm sound being emitted and detected. This can point a responder's attention to a specific person in the water. If the responder is familiar with what the wearer looks like, then the time to locate the wearer may be reduced in some circumstances.

Figure 1B:
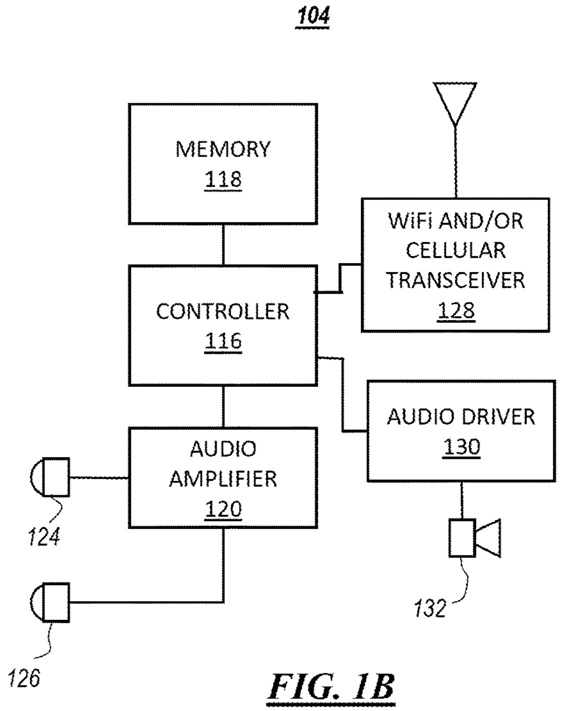
FIG. 1B is a receiver that receives the acoustic alarm signal and in response, generates an alarm to alert others.

FIG. 1B is a receiver unit 104 that receives the acoustic alarm signal generated by the wearable unit 102 and in response, generates an alarm to alert others. Like the wearable unit 102, the receiver unit 104 includes a controller 116 and memory 118 to execute instruction code that is designed to cause the receiver unit 104 to operate in accordance with the description herein. The controller 116 is coupled to an audio amplifier circuit 120 that receives acoustic waves at one or more hydrophones 124 126. The hydrophones 124, 126 are designed to receive acoustic waves while submerged and produce electric signals. The audio amplifier circuit 120 can be configured to amplify the signals produced by the hydrophones 124, 126 and provide the signals, in digital form, to the controller 116. The controller 116 can filter the sounds being received to detect the alarm sound (or a low battery sound) generated by the wearable unit 102. It will be appreciated that in some embodiments there can be multiple processors; one processor operating as the controller 116 at a higher level, and one processor that performs signal processing on the signals produced by the hydrophones 124, 126 to filter the sounds and determine whether the signals contain a component that strongly correlates to that of an alarm sound generated by a unit 102. In such a case, the signal processor can signal the controller 116 that an alarm sound has been detected.

Upon the controller 116 determining that the alert sound has been received, the controller 116 will operate an audio alarm comprised of an audio driver 130 and speaker 132. The speaker 132 is placed in air, so that it can be heard by other people in the area. The audio alarm can emit an alarm sound or tone, and/or it can play synthesized speech such as "please check all swimmers." In some embodiments different ones of the wearable units 102 can be configured to emit sounds at different frequencies. That is, each unit 102 can emit a selected unique frequency assigned to that particular unit 102. The receiver unit 104 can then determine which wearable unit is emitting the alert sound, and indicate such. For example, if two users are each wearing a wearable unit 102, and one of them is drowning, then their wearable unit will detect the low oxygen level, and emit its alert sound. The alert sound is received by the receiver unit 104 which can indicate which of the wearable units 102 needs attention. A voice synthesis alert can announce, for example, "user 1 is in need of attention." In addition to the audible alert, the receiver unit 104 can issue an electronic notification using a wireless networked radio transceiver 128. The transceiver 128 can operate on a local wireless network (WiFi) and/or access a cellular network to issue alerts to other cellular subscriber devices. Thus, a person who may not hear the audible alert from speaker 132 can receive a notification at their mobile device. For example, a person may be wearing headphones and listening to music on their mobile device when the audible alert goes off, and as a result, not hear the audible alert. An electronic notification will cause the mobile device to interrupt the music, or whatever it is doing, to ensure it is noticed. In fact, the mobile device can include an application program that, upon receiving an alert notification, can push a visual alert notification to the front of the user interface to ensure that it is seen over anything else the mobile device is being operated to do.

Figure 2:
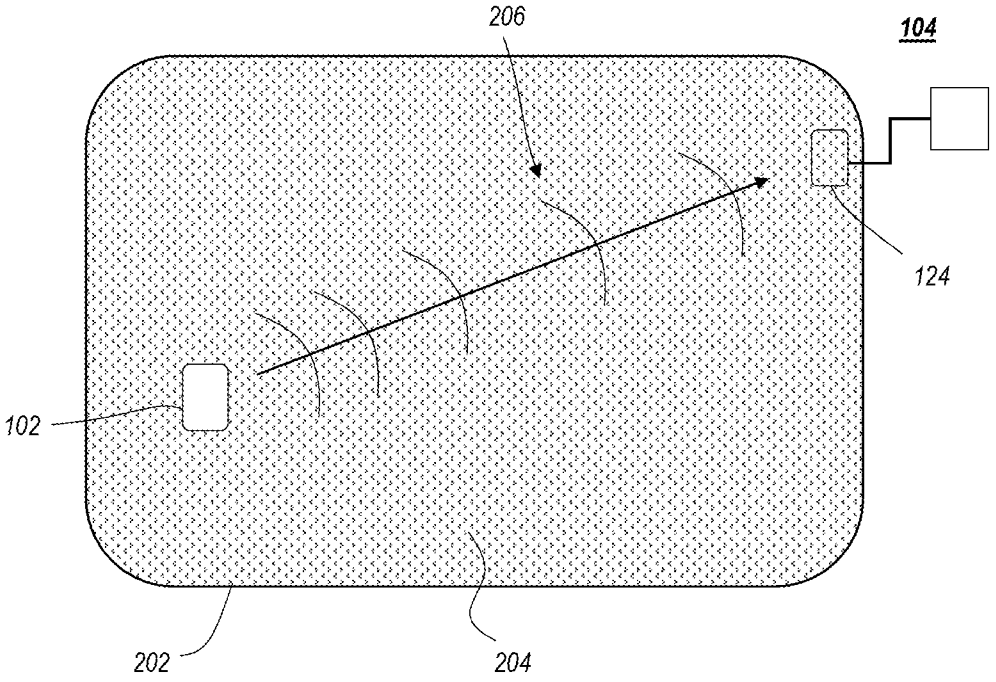
FIG. 2 is a pool diagram illustrating the application of the inventive drowning prevention system.

FIG. 2 is a pool diagram illustrating the application of the inventive drowning prevention system. A pool 202 is filled with water 204. A wearable unit 102, configured generally as shown in FIG. 1A, is worn by a person. In the event that person begins drowning, the wearable unit will emit an alert sound 206 into the water 204 that is received by the hydrophone 124 of the receiving unit 104. The receiving unit 104 is configured generally as shown in FIG. 1B. Upon detecting the alert sound, the receiving unit can emit an audible sound in the air, as well as issue electronic notifications. It should be noted that the wearer of the unit 102 can be in the pool 202 alone, or there can be other people present, including other people wearing alarm units such as unit 102. Various activity by people can generate sound in the water that is filtered by the receiving unit 104.

Figure 3:
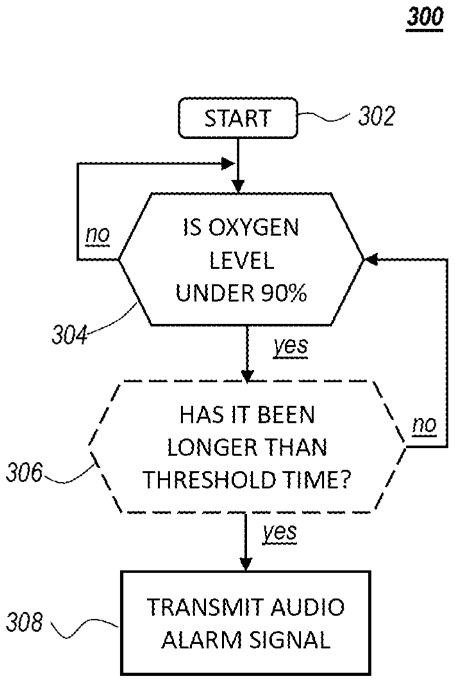
FIG. 3 is a flow chart diagram of a method for alerting people in response to the possible occurrence of a person drowning.

FIG. 3 is a flow chart diagram of a method 300 for alerting people in response to the possible occurrence of a person drowning. At the start 302 one or more people each put on a wearable device, such as that generally shown in FIG. 1A. Once properly worn and turned on, in step 304 the oxygen saturation detector of each wearable unit begins providing real time data indicating the blood oxygen saturation level of the wearer. If that level falls below a threshold (e.g. 90%), then (optionally) in step 306 the method determines if the wearer's blood oxygen saturation level has been below the threshold for a selected period of time. Steps 304, 306 are performed iteratively until either the wearer's blood oxygen saturation rises above the threshold used in step 304, or the time period is exceeded in step 306. However, if step 306 is omitted, then upon the controller of the wearable device determining that the blood oxygen level is below the established threshold, then it moves directly from step 304 to step 308. In step 308 the audio alarm is emitted by the wearable device. The audio alarm may be configured in step 302 to correspond to the particular person wearing the unit.

Figure 4A:
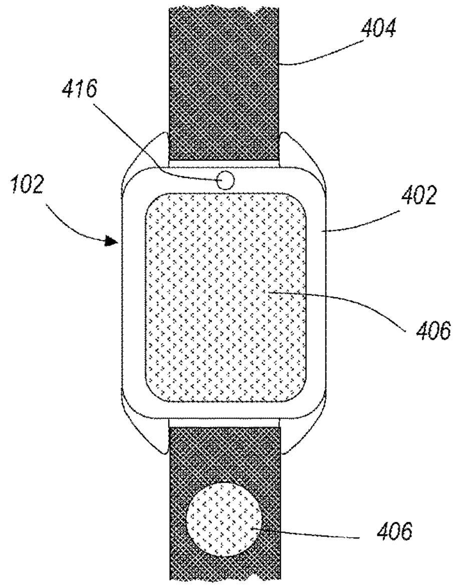
FIG. 4A shows the front/outward-facing side of a wrist strap alerting device, in accordance with some embodiments.

FIG. 4A shows the front/outward-facing side of a wrist strap alerting device 102, in accordance with some embodiments. The device 102 includes a water tight case 402 in which the various circuitry and components are housed. At the front face there can be a transducer 406 that is configured to emit alert sounds upon being driven by an audio driver circuit. Attached to opposite ends of the case is a strap 404 that can be used to encircle a wearer's wrist. The strap can be adjustable or it can be an elastic "one size fits all" strap. There can also be a light element such as a light emitting diode (LED) 416 for indicating, for example, a low battery state and a charging state. The light element 416 an be bicolor to indicate different battery states (low, charging, charged). In some embodiments the front area 406 can alternatively be a graphic interface for a smartwatch device. The transducer would then be ported through a side of the case 402. In some embodiments the transducer 406 can be located on the strap 404.

Figure 4B:
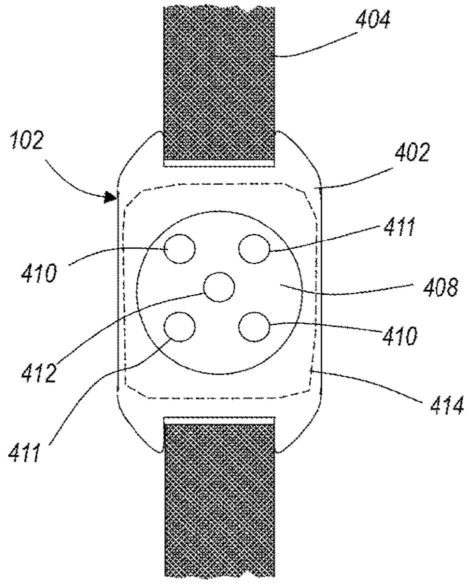
FIG. 4B is a back/wrist-facing side of a wrist strap alerting device, in accordance with some embodiments.

FIG. 4B is a back/wrist-facing side of a wrist strap alerting device 102, in accordance with some embodiments. At the back there is a sensor 408 that includes multiple light elements 410, 411 surrounding a light sensor 412. The light elements 410, 411 generate different wavelengths of light that are detected by the sensor 412 through the skin of the wearer, and the difference in response indicates the wearer's blood oxygen level. The wrist strap 404 is adjusted or sized to ensure adequate contact between the wearer's skin and the sensor 408 to produce reliable readings of the wearer's blood oxygen level. Thus, the sensor 408 operates as a conventional electronic oximeter sensor. Inside the case at the back there can be a coil 414 that is used to receive energy and charge the battery inside the case. That means that at least the back wall of the case cannot be a conductor so the magnetic field generated by a charging coil can pass through the case 402 and couple to the coil 414.

Figure 5:
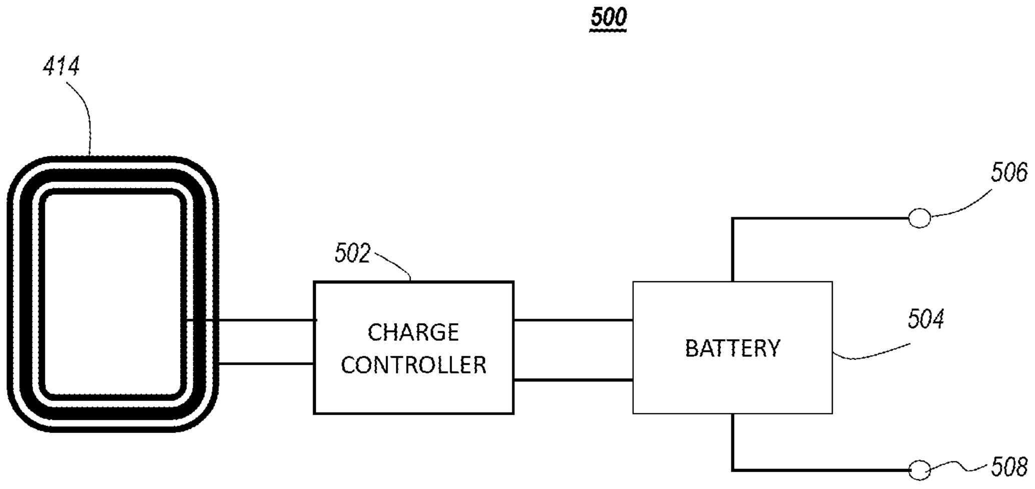
FIG. 5 is a wireless charging circuit for charging a battery of a wrist strap alerting device, in accordance with some embodiments.

FIG. 5 is a wireless charging circuit 500 for charging a battery 504 of a wrist strap alerting device, in accordance with some embodiments. A receiving coil 414 is used to receive energy transmitted by a charging coil that is located in close proximity to the receiving coil 414. The energy is in the form of an alternating electric signal which can be rectified by a charge controller into a direct current (DC) state. The charge controller provides a charge current and voltage to the battery 504 to charge the battery 504 according to an appropriate charging regime, which is dictated by the chemistry of the battery 504. The battery 504 outputs electric energy through terminals 506, 508 to power various circuits and components of the device.

Figure 6:
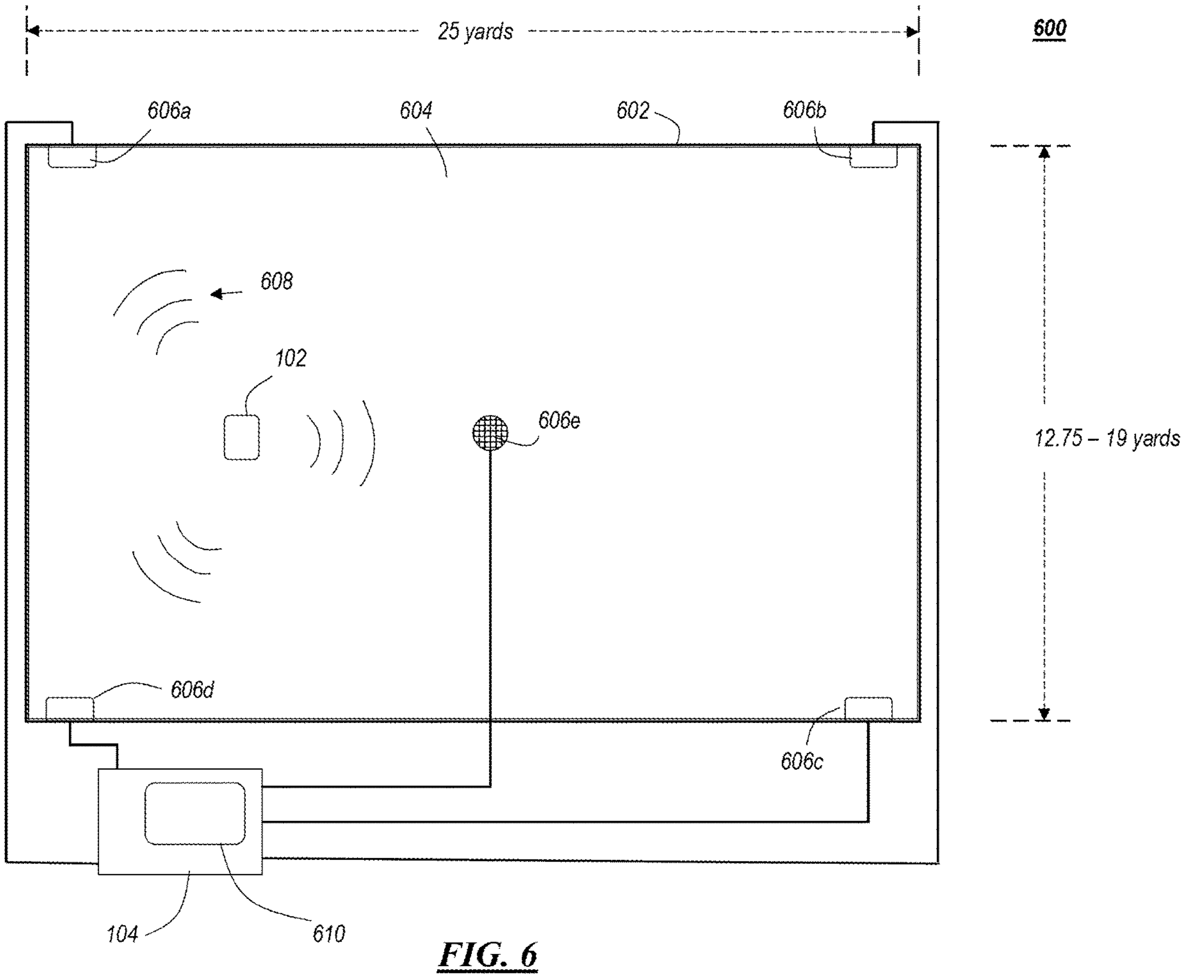
FIG. 6 is a pool diagram in which several hydrophones are used to detect alert sounds and allow for triangulation of the source of the sound, in accordance with some embodiments.

FIG. 6 is a pool diagram 600 in which several hydrophones 606_a_-606_e_ are used to detect alert sounds 608 and allow for triangulation of the source of the sound, in accordance with some embodiments. Prior examples assumed a relatively small pool, such as a typical residential pool. Testing has indicated that the alert sound 608 can travel about 5 meters at a power level that can be detected by hydrophones 606_a_-606_e_, based on an initial power generated by the alerting device 102. Thus, in a larger pool, such as a six-lane short course pool, such as those commonly found in schools and other public facilities, would need multiple hydrophones 606_a_-606_e_ to ensure that any alert sounds will be detected over the noise generated by multiple people in the water 604 of the pool 602. Larger pools may require additional hydrophones to ensure detection. Each of the hydrophones 606_a_-606_e_ are connected to a receiving unit 104, and specifically to the audio circuit of the receiving unit 104. An advantage of having multiple (at least three) hydrophones is that triangulation can be used to identify a location of the alerting device 102 when it is producing sound. Since the alerting device will transmit sound in all directions, if the alert sound 608 is detected by at least three hydrophones, the relative strength (magnitude) of the received signal can be used to triangulate the location of the device 102. This estimated location can be indicated on a map of the pool 602 displayed on a graphic interface 610 of the receiving device 104, or on the graphic interface of a mobile device that receives an alert message from the receiving device 104, or both. This can assist a lifeguard in quickly locating the swimming in distress in a busy pool.

Figure 7:
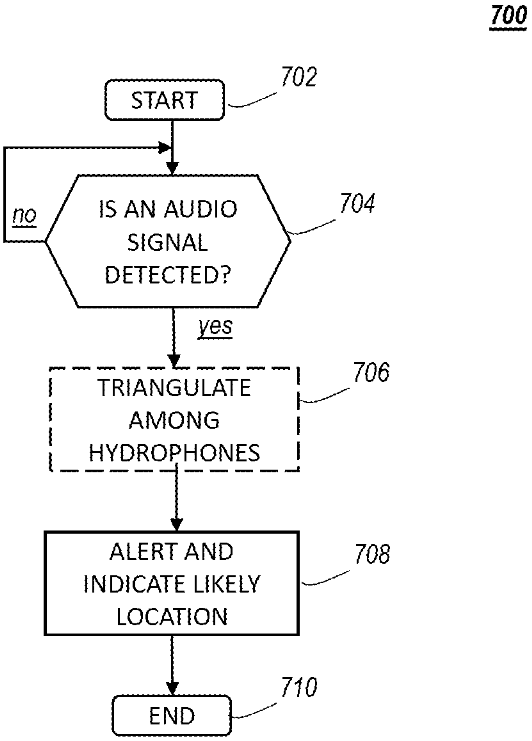
FIG. 7 shows a flow chart diagram of a method for alerting in response to detecting an alert sound in a pool, in accordance with some embodiments.

FIG. 7 shows a flow chart diagram of a method 700 for alerting in response to detecting an alert sound in a pool, in accordance with some embodiments. At the start 702, it is assumed that one or more swimmers are wearing an alert device (e.g., 102) that is configured to sense the wearer's blood oxygen level, and when the wearer's blood oxygen level falls below a preselected threshold, emit an alert sound. At the same time, it is assumed that a receiving device is properly configured and operating to detect any emitted alert sounds using hydrophones that are placed in the water, and which produce electric signals corresponding to acoustic waves incident on the hydrophone transducer. The receiving device is configured to filter out noise, such as that generated by people vocalizing, splashing, and other sounds routinely occurring around pool areas that may be picked up by the hydrophones. Thus, step 704 represent the receiving device constantly "listening" for an alert sound. The alert sound is a known sound that is emitted by the alert device worn by swimmers. This step is performed constantly unless and until an alert sound is detect. When an alert sound is detected, then the method proceeds to step 708 where an alert is generated. The alert can be an audible alert, an electronic message that is transmitted to another device (e.g. via multimedia messaging) using WiFi or BLUETOOTH links. In some embodiments a message sent over a cellular network can also be generated, although given latency in cellular networks this is not a primary means of alerting a responder. Preferably, the receiving device is capable of generating a loud audible alert, on the order of at least 95 decibels, and preferably at least 110 decibels. This will help ensure that the audible alert generated by the receiving device will be heard over the noise commonly occurring in a pool environment, as well as by people who are not immediately proximate to the pool. In an optional step 706, when there are multiple hydrophones connected to the receiving device, the receiving unit can determine an estimated location of the alert device generating the alert sound in the pool. This information can be mapped to a display of the pool that can be located, for example, at one or more lifeguard stations. At the moment the receiving unit generates the audible alert, a lifeguard can look at the display to see where the swimming in distress is located in the pool. In some embodiments, there can be several lifeguard stations, each with a visual alert (e.g., light element). When the location of the swimmer in distress is determined, then the visual alert at the lifeguard station closest to the swimmer in distress can be activated by the receiving unit.

The drowning prevention system disclosed herein avoids the problems of the prior art in detecting false indications of drowning due to, for example, inactivity or excessive activity, which is meant to correlate to either an unconscious person, or a person who is panicking. Instead, the inventive embodiments monitor the swimmer's blood oxygen level. A person in distress due to water in their lungs can experience a drop in blood oxygen level even before succumbing to unconsciousness. Thus, the disclosed drowning prevention system represents a substantial improvement in the state of the art of preventing drownings. In addition, the disclosed embodiments allow for the identification of the swimmer in distress, and the location of a swimmer in distress in a larger pool environment.

What is claimed is:

1. A drowning prevention system, comprising:

a wearable unit including a light-based blood oxygen sensor positioned against the wearer's skin and configured to detect a wearer's blood oxygen saturation level and, when the wearer's blood oxygen saturation level falls below a preselected threshold for at least a preselected duration of time as indicated by at least two consecutive periodic readings, emit an audio signal at a frequency selected to propagate through water, wherein different wearable units are assigned different frequencies so that each frequency is associated with a particular wearer; and a receiving unit having a plurality of hydrophones and a graphical user interface depicting a pool area, wherein the receiving unit is configured to receive the audio signal in water at the plurality of hydrophones, identify the particular wearer based on the frequency of the received audio signal, determine a location of the wearable unit based on differences in reception of the audio signal at the plurality of hydrophones, indicate the location and the identified wearer on the graphical interface, and in response generate an audible alert sound in air including an identification of the wearer.

2. The drowning prevention system of claim 1, wherein the wearable unit comprises an audio driver that is coupled to an acoustic transducer, wherein the audio driver provides a signal to the acoustic transducer the causes the acoustic transducer to emit the audio signal.

3. The drowning prevention system of claim 1, wherein the wearable unit contains a rechargeable battery.

4. The drowning prevention system of claim 3, wherein the wearable unit further comprises a charging coil that is used to charge the rechargeable battery.

5. The drowning prevention system of claim 1, wherein the receiving unit further comprises a wireless networking radio transceiver and is further configured to transmit an alert message via the wireless networking radio transceiver.

6. A wearable unit for preventing drowning, comprising:

a case containing:

a light-based blood oxygen saturation sensor positioned to contact a wearer's skin;

an acoustic transducer;

a controller that is configured to evaluate real time output of the blood oxygen saturation sensor and operate the acoustic transducer to emit an alert sound at a frequency selected to propagate through water upon a level of the output of the blood oxygen saturation sensor being below a preselected threshold for at least two consecutive periodic readings, wherein different wearable units are assigned different frequencies so that each frequency is associated with a particular wearer, the alert sound is at a frequency uniquely associated with the wearable unit of the different wearable units; and a strap coupled to the case and configured to hold the light-based oxygen sensor in the case against a wearer's skin.

7. The wearable unit of claim 6 wherein the wearable unit further contains a rechargeable battery.

8. The wearable unit of claim 7, wherein the wearable unit further comprises a charging coil that is used to charge the rechargeable battery.

9. A method for prevention of drowning, comprising:

providing a plurality of wearable units, each wearable unit is configured to be worn on a body of a wearer, each wearable unit including a light-based blood oxygen saturation sensor;

producing, periodically, by the blood oxygen saturation sensor, a blood oxygen saturation value;

comparing the blood oxygen saturation values with a preselected threshold;

when the blood oxygen saturation values are below the preselected threshold for at least two successive periodic values, the wearable unit emitting an alarm sound, wherein different ones of the plurality of wearable units are assigned different frequencies so that each frequency is associated with a particular wearer;

providing a receiving unit that includes a plurality of hydrophones and a graphical user interface depicting a pool area;

detecting at the receiving unit, via the plurality of hydrophones, the alarm sound emitted by the wearable unit; and in response to detecting the alarm sound, identify the particular wearer based on the frequency of the received alarm sound, determine a location of the wearable unit based on differences in reception of the alarm sound at the plurality of hydrophones, indicate the location and the identified wearer on the graphical interface, and the receiving unit generating an alarm including an identification of the wearer.

10. The method of claim 9, wherein the receiving unit generating the alarm comprises generating an audible alarm in air.

11. The method of claim 9, wherein the receiving unit generating the alarm comprises transmitting a message via a wireless networking radio transceiver.

* * * * *